G. E. CALLAWAY.
ROTARY ENGINE.
APPLICATION FILED JAN. 13, 1909.

962,310.

Patented June 21, 1910.

Witnesses
J. M. Fowler Jr
R. R. Duffie

Inventor
G. E. Callaway,
By John S. Duffie.
Attorney

G. E. CALLAWAY.
ROTARY ENGINE.
APPLICATION FILED JAN. 13, 1909.

962,310.

Patented June 21, 1910.
9 SHEETS—SHEET 4.

G. E. CALLAWAY.
ROTARY ENGINE.
APPLICATION FILED JAN. 13, 1909.

962,310.

Patented June 21, 1910.
9 SHEETS—SHEET 6.

Witnesses

Inventor
G. E. Callaway.
By John S. Duffie
Attorney

UNITED STATES PATENT OFFICE.

GEORGE ENOCH CALLAWAY, OF JONESBORO, LOUISIANA.

ROTARY ENGINE.

962,310.  Specification of Letters Patent.  Patented June 21, 1910.

Application filed January 13, 1909. Serial No. 472,032.

*To all whom it may concern:*

Be it known that I, GEORGE E. CALLAWAY, a citizen of the United States, residing at Jonesboro, in the parish of Jackson and State of Louisiana, have invented certain new and useful Improvements in Multiple-Expansion and Reversible Rotary Compound Engines, of which the following is a specification.

This invention relates to rotary engines, and particularly to multiple expansion rotaries and reversible rotaries.

An object of the present invention is to provide in a rotary engine a plurality of rotating pistons adapted to take steam at the smaller and to permit successive expansion of such steam through the several pistons to the larger.

A further object of the invention is to provide in a rotary engine a governor valve rotatable with the several pistons and independently rotatable relative to the pistons for the purpose of controlling the inlet of steam.

A further object of the invention is to provide in a rotary engine an improved form of pistons and cylinders together with abutments operating in the same.

A further object of the invention is to provide in a rotary engine a valve rotatable together with the piston, and with manually operable means adapted to rotate the valve independently of and relative to the piston.

With these and other objects in view, the invention comprises certain novel constructions, combinations and arrangements of parts as will be hereinafter fully described and claimed.

In the drawings.

Like characters of reference designate corresponding parts throughout the several views.

The engine which forms the subject-matter of this application shown at Fig. 1 of the multiple expansion type comprises a base 20 having bearing uprights 21 and 22 respectively providing chambers 23 and 24 employed as inlet and exhaust chambers and within which respectively shafts 25 and 26 rotate together, being connected by the pistons hereinafter described, which are preferably integrally connected and rigidly connected with adjacent ends of the shafts 25 and 26.

Figure 13:
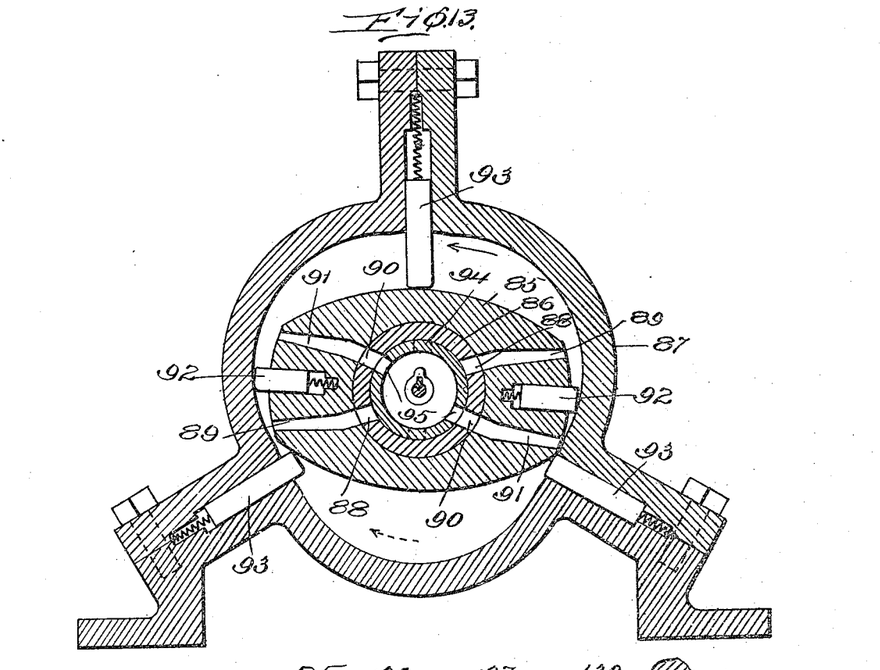
Fig. 13 is a transverse sectional view of the piston of the reversible type as seen on line 13—13 of Fig. 12.

The shaft 25 is provided with any approved form of openings or ports shown at 27 seen in cross section in Fig. 13 forming communication between the hollow shaft 25 and the chamber 23 so that steam admitted to the chamber 23 finds its way through the ports 27 into the interior of the hollow shaft 25.

Intermediate the bearings 22 and 21 a piston casing 28 is formed and the shaft 25 is journaled to rotate in such piston casing by means of ball bearings 29, similar ball bearings 30 and 31 being provided in the bearing 21. The shaft 26 is journaled to rotate in the piston casing 28 by means of the ball bearings 32, similar ball bearings 33 and 34 being provided for journaling the shaft in the bearing 22.

The hollow shaft 25 has its inner end closed integrally by a filler shown at 35 and communicates by means of a passage 36 through the valve 37, and a registering passage 38 through the shaft 25 with the inlet passage 39 in the piston 40. It is to be understood that preferably the valve 37 is provided with two of the passages 36, the shaft 35 with two of the passages 38 and the piston 40 with two of the passages 39, although it is to be understood that such number may be increased or decreased as the exigencies of the construction may make desirable.

The port 39 admits steam from the steam chest 23 through the hollow shaft 25, ports 36 and 38, to the interior of the piston casing or cylinder 41. The piston 40 is provided with swinging abutments 42 spring-pressed, and in front of the port 39 and adapted to bear against the interior surface of the cylinder 41. The cylinder is provided about its periphery with chambers or off-sets 43 in which swinging abutments 44 are mounted adapted to bear upon the periphery of the piston 40. It will be noted especially from Fig. 4, that the piston is oblate in formation and also that the interior of the cylinder is not circular but that between the abutments 44 the curvature of the cylinder is on a radius less than the radius of the cylinder from the center to the abutments 44. It will thus be seen that a chamber is formed between certain of the abutments 44 and the abutments 42 so that as the piston 40 rotates, the steam from the ports 39 bear at opposite portions against the abutments 44 which are not mounted to rotate and the abutments 42 which are mounted to rotate with the piston. The stationary or non-rotatable abutments 44 cause the expansion of the steam to act against the abutments 42 and to move the piston in the direction indicated by the arrow in Fig. 4.

The abutments 44 are provided with grooves 45 serving to carry packing, while the abutments 42 carry grooves 46 also adapted to carry packing. Both the abutments 42 and 44 are spring-pressed, the springs serving to hold the abutments 42 outwardly into engagement with the interior surface of the cylinder 41, while the springs also serve to hold the abutments 44 inwardly into engagement with the exterior surface of the piston 40.

The valve 37 is rigidly carried upon a rod 47 extending axially of the hollow shaft 25 and carrying packing 48 which prevents the passage of steam from the ports 27 outwardly through such shaft 25.

Figure 1:
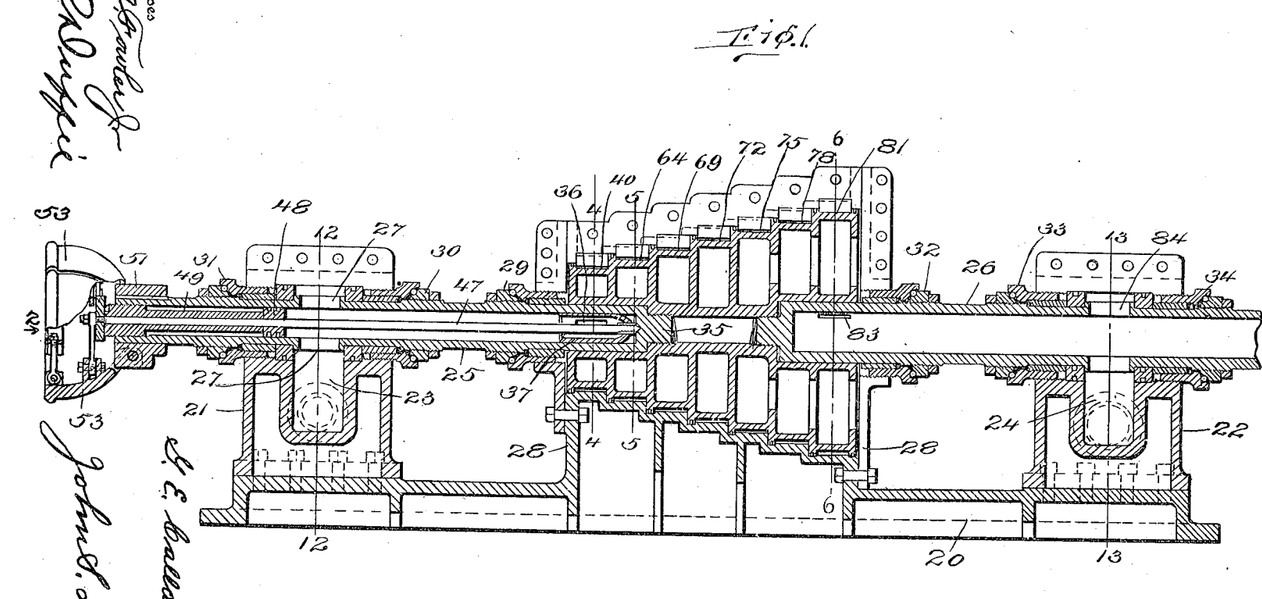
—Figure 1 is a view in vertical, longitudinal section diametrically through the pistons, of a multiple expansion rotary engine made in accordance with the present invention.
Figure 2:
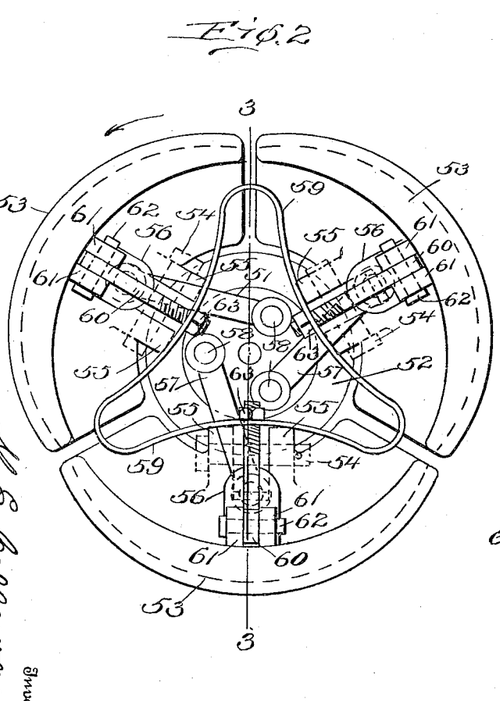
Fig. 2 is a view in end elevation of the governor taken on arrow 2 of Fig. 1.
Figure 3:
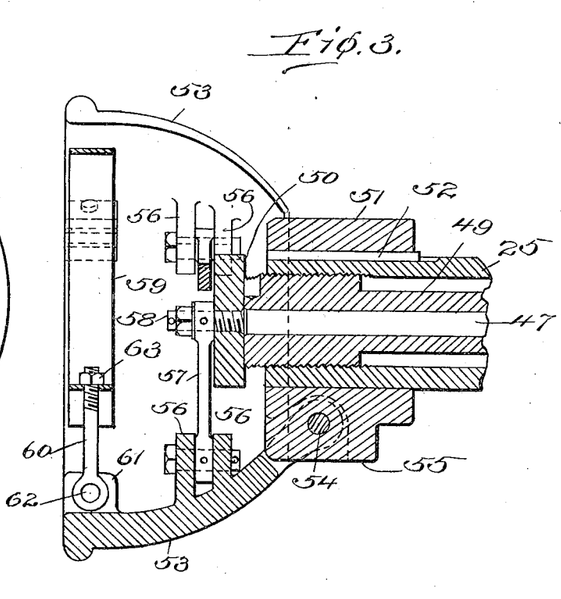
Fig. 3 is a diametrical sectional view of the governor taken on line 3—3 of Fig. 2.

Within the exterior end of the hollow shaft 25 a hollow sleeve 49 is inserted serving as a bearing for the shaft 47 as seen particularly in Figs. 1 and 3. Upon the external end of the shaft 47 a disk 50 is carried shown in Figs. 2 and 3, such disk being rigid with the shaft 47. About the outer end of the hollow shaft 25 a collar 51 is secured rigidly in any approved manner as by the key 52 and serves to fulcrum the governor weights 53 as by means of the pins 54, ears 55 being formed on such collar, and through which the said pins 54 extend.

The governor weights 53 together are preferably dish-shaped as shown at Figs. 2 and 3, and internally carry ears 56 between which are pivoted links 57 extending tangentially inwardly and pivotally connected with the disk 50 as by the studs 58. It will thus be seen that as the governor weights 53 move toward or away from the center of rotation upon the shaft 25 the ears 56 are moved toward and away from the disk 50 whereby by reason of the links 57 the disk 50 is rotated and therewith is rotated the shaft 47.

The shaft 47 being rigidly connected with the valve 37 rotates such valve therewith moving the port 36 relative to the port 38, thereby opening or closing to a greater or less extent communication between the hollow shaft 25 and the piston 40.

The governor weights 53 are held normally inwardly by means of a spring 50 generally triangular in shape as shown particularly in Fig. 2, such connection being accomplished by means of links 60 connected at their outer ends with ears 61 by means of pivot pins 62 and adjustable at their inner ends with the spring 59 by means of tension nuts 63, so that the tendency of the spring 59 is to hold the governor weights 53 yieldingly inward but to permit the outward movement of such governor weights under centrifugal force against the tension of such spring.

Figure 4:
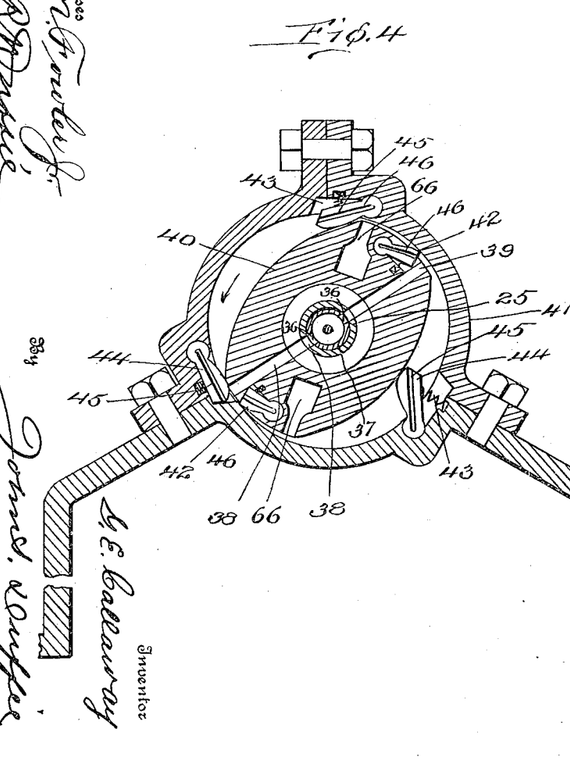
Fig. 4 is a view in transverse section through the smaller piston taken on line 4—4 of Fig. 1.
Figure 5:
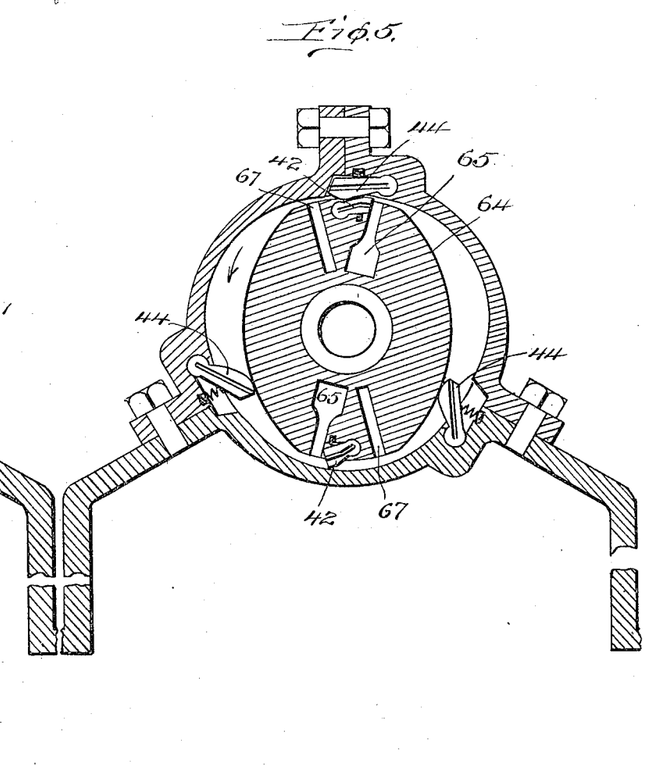
Fig. 5 is a cross section through the intermediate pistons and taken respectively on line 5 of Fig. 1.
Figure 6:
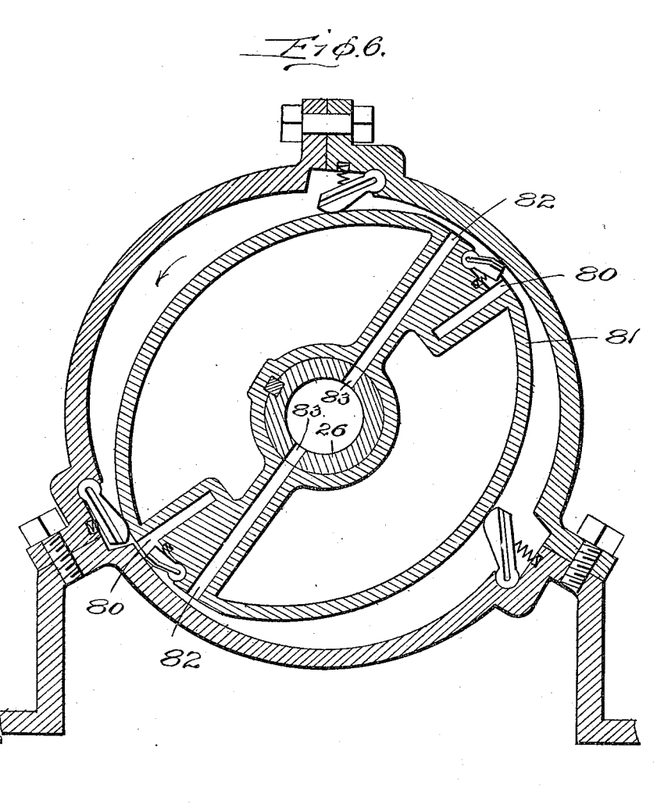
Fig. 6 is a transverse sectional view of the larger piston taken on line 6—6 of Fig. 1 and showing the exhaust ports.
Figure 7:
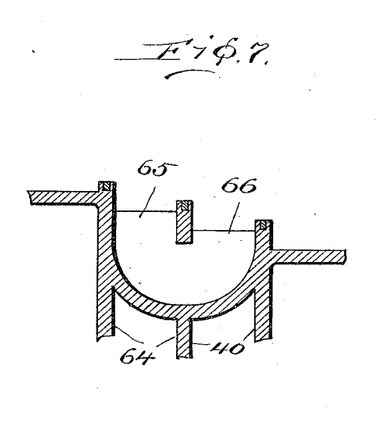
Fig. 7 is a fragmentary detail view showing the passage from one piston to the adjacent piston.
Figure 8:
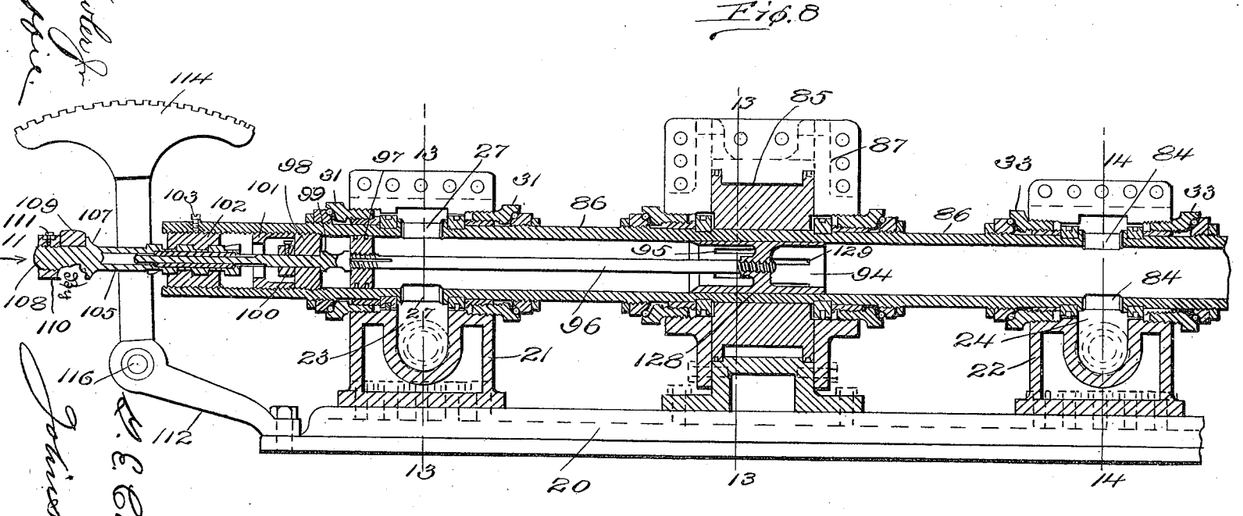
Fig. 8 is a longitudinal, diametrical sectional view of the improved engine showing the reversible features.
Figure 9:
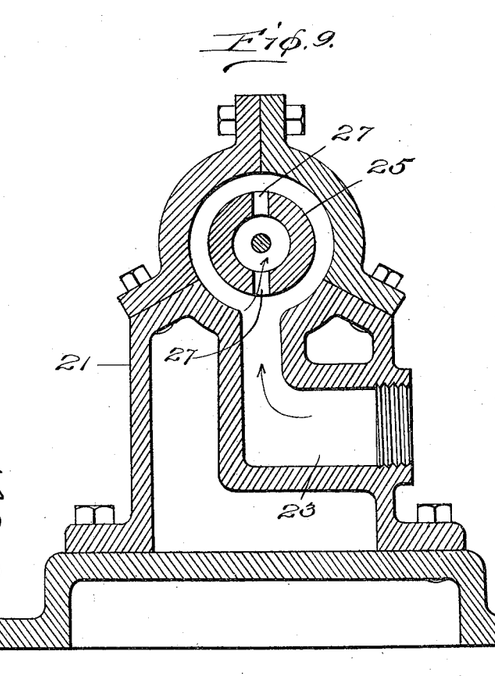
Fig. 9 is a view in transverse section of the inlet port and associate parts taken on line 9—9 of Figs. 1 and 12.
Figure 10:
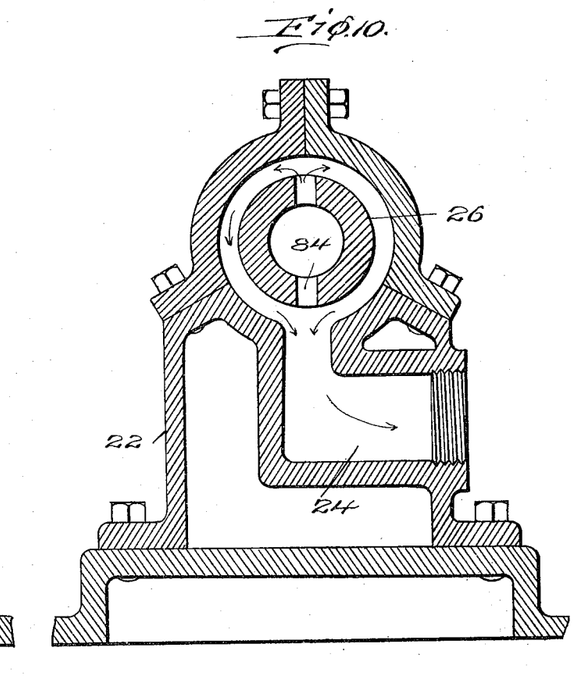
Fig. 10 is a view in transverse, vertical section of the exhaust ports and associate parts taken on line 13—13 of Fig. 1 and line 14—14 of Fig. 12.

The several pistons forming the multiple feature of the present invention are preferably cast integral, although such integral casting is not necessary but as here shown the piston 64 shown at Figs. 1 and 5 is adjacent the pistons 40 and its inlet ports 65 are in communication with the exhaust ports 66 of the piston 40 as will be apparent by consulting Figs. 4 and 5. By consulting Fig. 11 it will be seen in what manner the said pistons communicate, the port 66 there shown representing the port 66 of piston 40 and the port 65 the inlet port 65 of the piston 64. It will be apparent, therefore, that after the steam has expanded in the chamber between the cylinder and the piston and after the exhaust port has passed the swinging abutments 44 the steam will exhaust through the port 66 as shown at Figs. 4, 5 and 7, and enter through the inlet port 65 of the next adjacent piston. The piston 64 is similarly provided with exhaust ports 67 communicating by passages similar in all respects to the passage shown at Fig. 7, with the inlet ports 68 of the next adjacent piston 69 shown at Fig. 6 and after therein expanding exhausted through similar exhaust ports 70 communicating in similar manner with the inlet ports 71 of the next adjacent piston 72 and similarly exhausting through ports 73. The exhaust ports 73 communicate in similar manner with the inlet ports 74 of the piston 75, and exhaust in like manner through exhaust ports 76 to the inlet ports 77 of the piston 78 again and similarly exhausting through exhaust ports 79 to inlet ports 80 of the piston 81 shown at Fig. 6. After the final expansion within the piston casing embracing the piston 81 the steam is exhausted through the exhaust ports 82 which are in communication by means of ports 83 with the hollow shaft 26, from which it is exhausted through ports 84 to the exhaust chamber 24 as shown in Fig. 10. It will thus be apparent that steam admitted to the steam chest 23 enters the hollow shaft 25 through the ports 27 and passes thence through the ports 36 of the valve 37 to the piston 40. After expanding relative to the piston 40 as before described it is exhausted to the piston 64 and successively in like manner to the pistons 69, 72, 75, 78 and 81 being finally exhausted through the port 82 to the hollow shaft 26 and through the exhaust chamber 24.

It will be apparent that the admission of steam as above described will rotate the pistons carrying therewith the shaft 25 which will cause the governor weights 53 by centrifugal force to expand outwardly rotating the shaft 47 and valve 37 to cut off a part of the area of the ports to the first piston. In this manner the admission of steam to the piston is automatically regulated.

At Figs. 8, 11, 12, 13 and 15, means is shown for controlling the rotary engine for reversing purposes. The type of piston employed is shown at Fig. 13 numbered 85 and is as above described an oblate piston rigidly mounted upon a hollow shaft 86 and within a piston casing 87. The hollow shaft 86 is mounted to rotate in the bearings 21 and 22, the same ball bearing members 31 and 33 being provided, such bearings also being provided with the steam chest 23 and the exhaust chest 24. The hollow shaft 86 is also provided with the inlet ports 27 communicating with the steam chest 23 and the exhaust ports 84 communicating with the chest 24. The hollow shaft 86 is provided with ports 88 communicating with passages 89 formed in the piston and also with ports 90 communicating with passages 91. Between the extremities of the passages 89 and 91 sliding abutments 92 are mounted adapted for engagement with the interior of the piston casing 87 and such piston casing is also provided with sliding abutments 93 adapted to bear against the outer periphery of the piston 85.

It will be apparent that with steam admitted through the ports 91 the expansion of such steam will act between the abutments 92 and 93 to rotate the piston in the direction shown by the full line arrow in Fig. 17. The admission of steam to the ports 91 is controlled by means of a valve 94 rotatably mounted within the shaft 86, and having ports 95 positioned to register either with the passages 88 or 90 as the valve 94 may be rotated within the shaft 86.

With the valve 94 rotated so that the ports 95 are in communication with the passages 88 it will be apparent that the expansion of the steam will be upon opposite sides of the abutments from that just described so that the piston shown at Fig. 13 will rotate in the opposite direction from that indicated by the arrow shown above the piston in said figure. To control such rotation of the valve 94 a shaft 96 is mounted axially within the said shaft 86 with a packing collar 97 carried rigidly thereupon and rotatable therewith to prevent the escape of steam entering such hollow shaft 86 through the ports 27. Rigidly carried by the shaft 86 is a collar 98, the shaft 96 having an annular shoulder 99 abutting against such collar on one side and an adjustable collar 100 abutting against such rigid collar 98 upon the opposite side which prevents the longitudinal movement of the shaft 96, and holds the valve 94 to position. The collar 98 is positioned by means of a lock nut 101 also inserted within the screw-threaded interior of the shaft 86, such construction being shown in enlarged detail at Fig. 12.

Within the extremity of the hollow shaft 86 a collar 102 is inserted maintained rigidly in position by means of a set screw 103 and provided internally with a screw thread 104. Within the screw thread 104 a worm 105 is adapted to move being movable longitudinally upon the shaft 96, but splined thereto by the keys 106 preventing rotatable movement thereupon. The worm 105 is formed hollow as shown in section in Fig. 8 so that longitudinal or telescoping movement between such worm 105 and the shaft 96 is permitted. Upon the exterior end of the worm shaft 105, a shoulder 107 is formed defining a stud 108 upon which a yoke 109 is adapted to rotate and is held against longitudinal displacement by a collar 110 held rigidly in place in any approved manner by the set screw 111.

Figure 11:
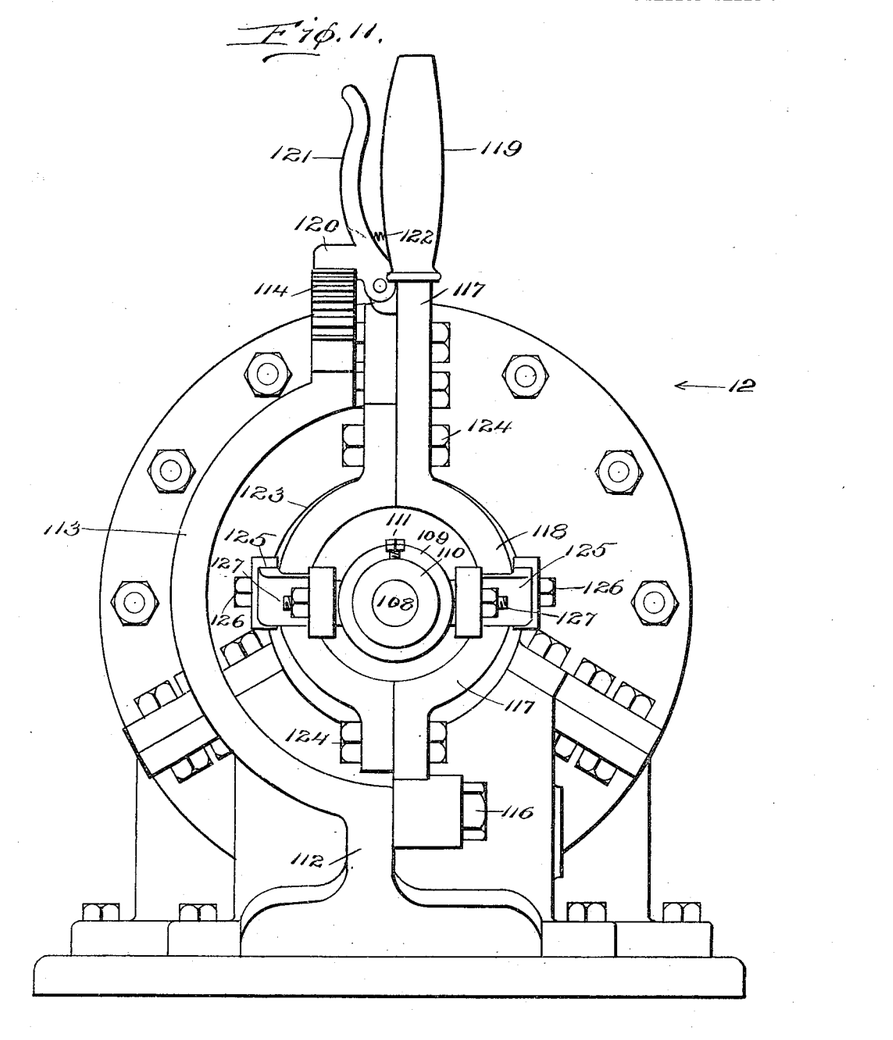
Fig. 11 is an enlarged end view of the rotary engine of reversible type as seen on arrow 11 of Fig. 12.
Figure 12:
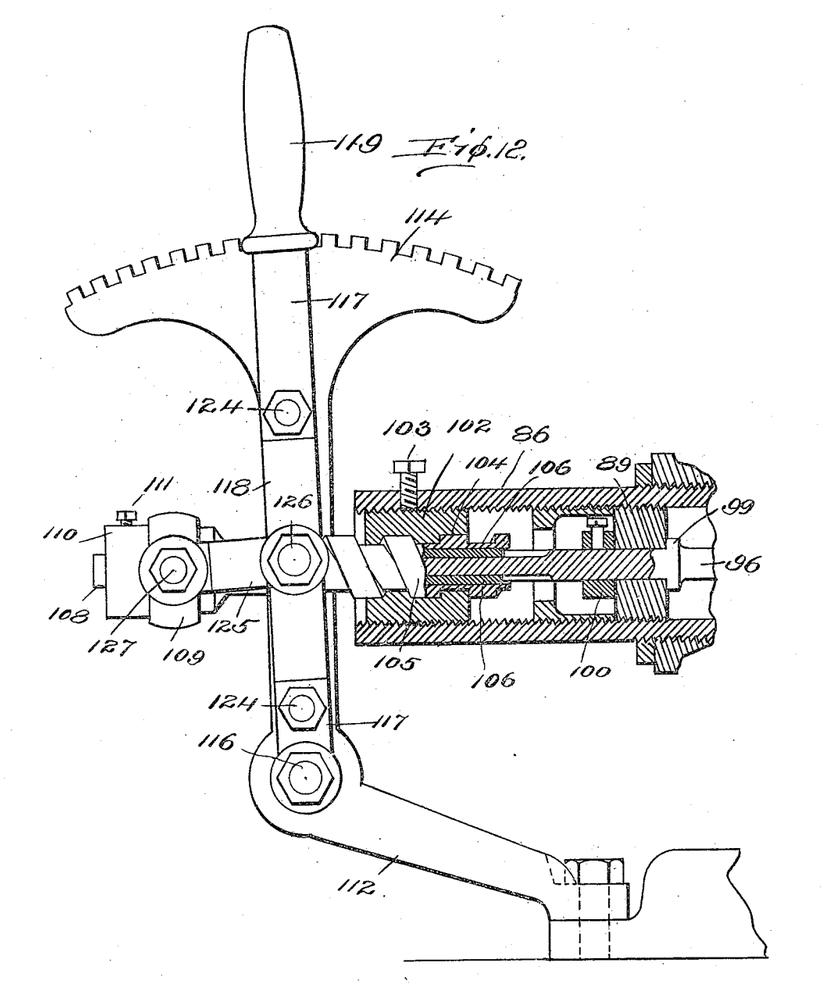
Fig. 12 is a view partly in side elevation and partly in longitudinal diametrical section of the controlling lever and associate parts as seen on arrow 12 of Fig. 15.

Rigidly secured to the base 20 is an arm 112 having a curve as shown at 113 in Fig. 11 embracing the worm 105 and having at its upper end a segmental rack 114.

Pivoted at 116 upon the arm 112 is a lever 117 curved as at 118 to embrace the worm 105 and provided at its upper end with a handle 119 and a pawl 120 controlled by a lever 121. The pawl 120 is adapted to engage against the teeth of the segmental rack 114 and is held yieldingly in such engagement by a spring 122. A curved member 123 is secured to the lever 117 in any approved manner as by the bolts 124 and is curved similar to the curve portion 118. To the opposite sides of the curves 118 and 123 links 125 are secured in any approved manner as by the pivot pins 126 and at their opposite ends are secured to the studs 127 of the yoke 109.

It will be apparent that as the lever 117 is moved the links 125 will move the yoke 109 and carry therewith the worm 105 which is rotating constantly with the shaft 86. Such longitudinal movement of the worm 105 will rotate the shaft 96 independently of the shaft 86 and rotate therewith the valve 94. Such rotation of the valve 94 may be for the purpose of controlling the area of the inlet ports and to thereby control the admission of steam to the piston 85 or it may be a complete reversal of the ports 95 so that instead of registering with the ports 90 as shown in Fig. 13, they will register with the ports 88.

The valve 94 is provided centrally of its length with a diaphragm 128 which prevents the passage of steam in that direction and such valve is provided also with ports 129 upon the end of such valve opposite the ports 95. The ports 29 are adapted at times to register with the ports 88 and 90 of the piston 85 as, for instance, when the ports 95 are registering with the ports 90 as shown in Fig. 17, the ports 129 will be registering with the ports 88 so that such ports 88 and the ports 129 form the exhaust ports exhausting into the interior of the hollow shaft 86 and from thence to the ports 84 to the exhaust chamber 24. Of course, when the valve 24 is rotated so that the ports 95 are brought into registration with the ports 88 the exhaust ports 129 will register with the ports 90 and the introduction of steam and the rotation of the piston will be reversed.

Figure 14:
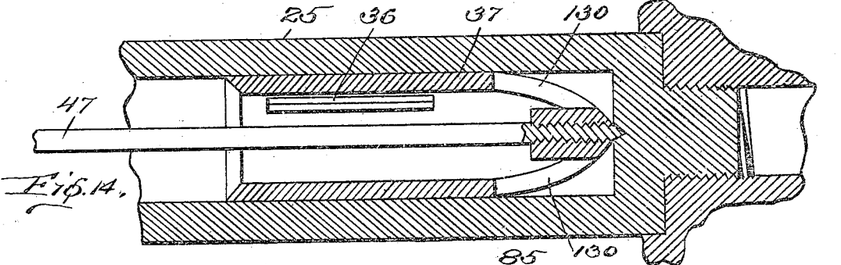
Fig. 14 is a diametrical, sectional view of one form of the rotating valve.
Figure 15:
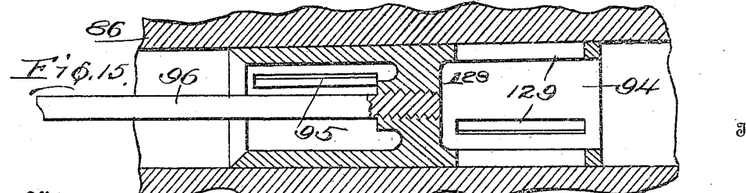
Fig. 15 is a similar view of the rotating valve as employed on the reversible type of engine.

All of the adjacently moving parts shown in the several figures, are provided with packing rings or equivalent means to prevent the escape of steam, it not being believed that it will be necessary to refer specifically and by numbers to such packing rings as they are common in the art, and are apparent from an examination of the figures. As shown in Figs. 1 and 14 the valve 37 is provided with ports 130 permitting the passage of steam through such valve into engagement with the closed end of the shaft 129 whereby the valve 37 is balanced. It will be apparent that the valve 94 is balanced by the diaphragm 128 and the collar 97.

What I claim is:—

1. A rotary engine comprising a base provided at its intermediate portion with a casing having a series of chambers, bearing uprights on said base on opposite sides of the intermediate casing and having one an inlet chamber and the other an exhaust chamber, a series of connected pistons operating in the chambers of the intermediate casing, hollow feed and exhaust shafts supported at their outer ends in their respective bearing uprights and having ports communicating with the chambers thereof and the said hollow shafts being connected at their inner adjacent ends with the opposite ends of the series of connected pistons and ported for the passage of feed and exhaust steam respectively, a valve controlling the passage of steam to the pistons and means operated by the revolution of the feed shaft for controlling said valve, substantially as set forth.

2. A rotary engine comprising a base, a casing on the intermediate portion of the said base, piston devices operating in said casing, bearing uprights on the base on opposite sides of the casing and provided with chambers, the chamber of one upright being an inlet chamber and that of the other an exhaust chamber, hollow feed and exhaust shafts supported at their outer ends in their respective bearing uprights and having ports communicating with the chambers of said uprights, said hollow shafts being connected at their inner adjacent ends with the piston devices in the intermediate casing and ported for the passage of feed and exhaust steam respectively, a valve controlling the feed of steam to the piston devices and means for controlling said valve, substantially as set forth.

3. A rotary engine comprising a piston and its casing, stands on opposite sides of said casing and having bearings alined with the axis of the piston, said stands being provided one with an inlet chamber and the other with an exhaust chamber, feed and exhaust shafts in the bearings of their respective stands and communicating with the chamber thereof and connected at their inner ends with the piston, one of said shafts being extended outwardly beyond its bearing stand, a valve operating in the feed shaft and means carried by the said outer extended end of the shaft for automatically operating said valve, substantially as set forth.

4. A rotary engine comprising a base, a casing on the said base and intermediate the ends thereof, bearing uprights on said base on opposite sides of the intermediate casing, said uprights having one an inlet chamber and the other an exhaust chamber, piston devices in the casing, hollow feed and exhaust shafts supported in their respective bearing uprights and having ports communicating with the chambers thereof, the said shafts being connected at their inner adjacent ends with the piston devices, a feed valve operating in the feed shaft and adapted to deliver steam to the piston devices and automatically operating devices carried by the feed shaft and connected with the valve to operate the same, substantially as set forth.

5. A rotary engine comprising hollow feed and exhaust shafts, piston devices connected with the inner adjacent ends thereof, a casing inclosing said piston devices, bearing stands on opposite sides of the casing and having bearings for the feed and exhaust shafts and also having feed and exhaust chambers which chambers extend around the shafts whereby to communicate with the shafts in all positions of the shafts, the latter having ports to communicate with the chambers of their respective bearing stands, all substantially as and for the purposes set forth.

In testimony whereof I affix my signature, in presence of two witnesses.

GEO. ENOCH CALLAWAY.

Witnesses:
J. A. WHEAT,
E. M. TALBOT.